(12) United States Patent
Koepke

(10) Patent No.: US 12,741,490 B2
(45) Date of Patent: Sep. 22, 2026

(54) SYSTEMS AND METHODS FOR SIPE PATTERNS

(71) Applicant: BRIDGESTONE BANDAG, LLC, Muscatine, IA (US)

(72) Inventor: Logan M. Koepke, Muscatine, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 136 days.

(21) Appl. No.: 18/272,213

(22) PCT Filed: Jan. 14, 2022

(86) PCT No.: PCT/US2022/070192
§ 371 (c)(1),
(2) Date: Jul. 13, 2023

(87) PCT Pub. No.: WO2022/155670
PCT Pub. Date: Jul. 21, 2022

(65) Prior Publication Data

US 2024/0066928 A1 Feb. 29, 2024

Related U.S. Application Data

(60) Provisional application No. 63/137,369, filed on Jan. 14, 2021.

(51) Int. Cl.
*B60C 11/12* (2006.01)
*B60C 11/03* (2006.01)

(52) U.S. Cl.
CPC ... *B60C 11/1236* (2013.01); *B60C 2011/0346* (2013.01); *B60C 2011/1245* (2013.01); *B60C 2011/1268* (2013.01)

(58) Field of Classification Search
CPC ..... B60C 2011/1231; B60C 2011/1245; B60C 11/1236
See application file for complete search history.

(56) References Cited

U.S. PATENT DOCUMENTS 2,186,180 A * 1/1940 Sloman .................. B60C 11/12 152/DIG. 3
3,328,849 A 7/1967 Gerald et al.
(Continued)

FOREIGN PATENT DOCUMENTS

AT 385953 B 6/1988
CN 104703818 A 6/2015
(Continued)

OTHER PUBLICATIONS

English machine translation of JP03-038406 (Year: NA) (Year: 1991).*

(Continued)

*Primary Examiner* — Robert C Dye

(57) ABSTRACT

A tire tread is provided. The tire tread includes a plurality of tread elements positioned on a tire tread surface so as to comprise a tread pattern. The tire tread also includes a plurality of grooves provided between the plurality of tread elements. A first set of sipes is provided to the tire tread, the first set of sipes extending from a longitudinal axis of the tire tread and toward a first edge of the tire tread at a first non-zero angle with respect to a lateral axis of the tire tread. A second set of sipes is also provided to the tire tread, the second set of sipes extending from the longitudinal axis and toward the first edge of the tire tread at a second non-zero angle with respect to the lateral axis, the second set of sipes intersecting the first set of sipes.

23 Claims, 13 Drawing Sheets

(56) References Cited

U.S. PATENT DOCUMENTS 3,820,580 A 6/1974 Meserve et al.
4,306,607 A 12/1981 Curry
4,353,402 A 10/1982 Burche et al.
4,609,026 A 9/1986 Kondoh
4,934,424 A * 6/1990 Kojima .................. B60C 11/12 152/902
D316,065 S 4/1991 Tsuda
5,591,280 A 1/1997 Asano
6,478,062 B1* 11/2002 Schomburg ............. B60C 11/12 152/209.15
6,571,844 B1 6/2003 Ochi et al.
D478,864 S 8/2003 Okano
6,609,417 B1 8/2003 Cantu et al.
D505,384 S 5/2005 Kageyama
D516,014 S 2/2006 Fukunaga
D517,002 S 3/2006 Welbes
D550,610 S 9/2007 Guspodin et al.
D559,773 S 1/2008 Campana
7,467,652 B2 12/2008 Knispel et al.
D586,732 S 2/2009 Heinen et al.
D589,438 S 3/2009 Heinen et al.
D610,530 S 2/2010 Perdriat
D633,861 S 3/2011 Shan et al.
D644,600 S 9/2011 Nicolas et al.
D656,890 S 4/2012 Rittweger
D660,224 S 5/2012 Takahashi
9,221,224 B2 12/2015 Rey
D751,975 S 3/2016 Cerny
9,278,582 B2 3/2016 Stuckey
D761,197 S 7/2016 Dixon
9,434,214 B2 9/2016 Iwamura
9,463,672 B2 10/2016 Mathonet et al.
9,878,584 B2 1/2018 Martin
D816,597 S 5/2018 Schoeppner et al.
D816,599 S 5/2018 Dixon et al.
D821,964 S 7/2018 Speziari et al.
D834,511 S 11/2018 Wang
10,166,820 B2 1/2019 Asayama
D860,928 S 9/2019 Dixon et al.
D870,030 S 12/2019 Wang
D875,660 S 2/2020 Thieman
D882,508 S 4/2020 Herbeuval
D885,321 S 5/2020 Spagnolo
D886,033 S 6/2020 Kristen
D886,034 S 6/2020 Pribula et al.
D886,727 S 6/2020 Bortolet
10,780,662 B2 9/2020 Coel et al.
10,906,359 B2 2/2021 Korkama et al.
11,077,718 B2 8/2021 Li
D943,506 S 2/2022 Toscano et al.
D948,418 S 4/2022 Guilford
D956,671 S 7/2022 Koguma
D958,727 S 7/2022 Pribula
2003/0070742 A1 4/2003 Risser
2007/0272337 A1 11/2007 Bovaird et al.
2008/0196808 A1* 8/2008 Ikeda .................. B60C 11/0306 152/209.24
2009/0283189 A1 11/2009 Mun
2011/0162770 A1 7/2011 Yamakawa
2011/0180191 A1 7/2011 Christenbury
2012/0103491 A1 5/2012 Knispel
2013/0284332 A1 10/2013 Rey et al.
2015/0273950 A1 10/2015 Martin et al.
2016/0325451 A1 11/2016 Wang et al.
2017/0368884 A1 12/2017 Furusawa
2018/0236821 A1 8/2018 Li
2018/0250988 A1 9/2018 Fontaine et al.
2019/0061296 A1 2/2019 Coel
2019/0118583 A1* 4/2019 Nakamura ............. B60C 11/12
2019/0160881 A1 5/2019 Chen et al.
2019/0184760 A1* 6/2019 Cerny ..................... B60C 11/04
2019/0193489 A1 6/2019 Kishizoe
2019/0210410 A1 7/2019 Tikka et al.
2019/0329510 A1 10/2019 Bessac et al.
2021/0023888 A1* 1/2021 Watanabe ........... B60C 11/0306
2022/0009291 A1* 1/2022 Voss .................... B60C 11/1218
2024/0066928 A1 2/2024 Koepke

FOREIGN PATENT DOCUMENTS

CN 109219530 A 1/2019
CN 111347826 A 6/2020
DE 19827244 A1 12/1999
DE 102006036509 A1 2/2008
DE 102015224290 A1 6/2017
EP 0 119 839 A2 9/1984
EP 691222 A2 * 1/1996 ............. B60C 11/12
EP 0691222 B1 8/1998
EP 1 140 527 A1 10/2001
EP 1 580 034 B1 9/2005
EP 1 926 609 A1 6/2008
EP 2 026 983 B1 8/2009
EP 3 088 212 A1 11/2016
EP 3 446 888 A1 2/2019
EP 3 645 317 A1 5/2020
FR 2190600 A1 2/1974
GB 2160829 A * 1/1986 ......... B60C 11/0318
JP S61135735 A 6/1986
JP 62018305 A * 1/1987 ............. B60C 11/12
JP H02-267007 A 10/1990
JP 03038406 A * 2/1991
JP 06191228 A * 7/1994
JP 08-040021 2/1996
JP H08-040021 A 2/1996
JP 2006-312272 A 11/2006
JP 4726106 B2 7/2011
JP 5962282 B2 8/2016
KR 20100002785 A 1/2010
KR 100985903 10/2010
WO WO-2014/090437 A1 6/2014
WO WO-2016/054244 A1 4/2016
WO WO-2018/140851 A1 8/2018
WO 2019004994 A1 1/2019
WO WO-2022/128022 A1 6/2022
WO WO-2022/155670 A1 7/2022

OTHER PUBLICATIONS

English machine translation of EP0691222. (Year: NA) (Year: 1996).*

English machine translation of JPH06191228 (Year: NA) (Year: 1994).*

English machine translation of JPS6218305A (Year: NA) (Year: 1987).*

Nokian Tyres, "Nokian Block Optimized Siping," retrieved from https://www.nokiantyres.com/innovation/innovations/nokian-block-optimized-siping/, 3 pages (accessed Sep. 29, 2021).

Continental Tires, "Tyre Basics: Passenger Car Tyres," retrieved from https://blobs.continental-tires.com/www8/servlet/blob/693274/d2e4d4663a7c79ca81011ab47715e911/download-tire-basics-data.pdf, 32 pages (Oct. 2013).

Razguliaev, Alamy Stock Photo, retrieved from https://www.alamy.com/winter-studded-tire-tread-sipes-grooves-and-spikes-close-up-on-black-background-safe-winter-driving-image327088339.html, 1 page (Sep. 15, 2019).

EP Search Report for EP Application No. 22740260.9 dated Nov. 26, 2024, pp. 1-9.

EP Search Report for EP Application No. 22750618 dated Dec. 11, 2024, pp. 1-6.

U.S. Appl. No. 29/914,297, filed Oct. 16, 2023.

Undated, admitted prior art, Bandag B163, 1 pg.

Continental Tires, "Tyre Basics: Passenger Car Tyres," retrieved from https://blobs.continental-tires.com/www8/servlet/blob/693274/d2e4d4663a7c79ca81011ab47715e911/download-tire-basics-data.pdf, 32 pages (2013).

English machine translation of non-patent literature—Bridgestone Bandag, B163, 1 pg., May 2021.

International Search Report and Written Opinion for PCT Application No. PCT/US2022/070192, dated May 3, 2022.

(56) References Cited

OTHER PUBLICATIONS

International Search Report and Written Opinion for PCT Application No. PCT/US2022/070472, dated May 18, 2022, pp. 1-8.
Nokian Tyres, "Nokian Block Optimized Siping," retrieved from https:/www.nokiantyres.com/innovation/innovations/nokian-block-optimized-siping/, 3 pages (no date; accessed Sep. 29, 2021).
Razguliaev, "winter studded tire tread, sipes grooves and spikes close—up on black background, safe winter driving," Alamy Stock Photo, retrieved from https://www.alamy.com/winter-studded-tire-tread-sipes-grooves-and-spikes-close-up-on-black-background-safe-winter-driving-image327088339.html, 1 page (2019).
Saf-Tee Siping & Grooving Inc., nht88-1.2 Interpretation, National Highway Traffic Safety Administration, Jan. 1, 1988.
Tire Demon—Tire Scythe, https://222.youtube.com/watch?v=15_RPf3wNK4.
US Office Action for U.S. Appl. No. 18/801,011, dated Sep. 25, 2025.
Office Action for CN Application No. 202280011547.4, dated Dec. 3, 2025.
Office Action for EP Application No. 22740260.9, dated Jul. 21, 2026.

* cited by examiner 126
128
160
164
124
$W_H$
166
162
118
α
β
122

126
112
162
166
116
110
120
300
164
160
$A_L$
130

131
134
132
135
133
126
128
$W_H$
166
162
118
α
β
$A_G$
126
116
124
112
110
122
700
141
142
143
144
145
$A_L$
130
120

SYSTEMS AND METHODS FOR SIPE PATTERNS

CROSS-REFERENCE TO RELATED PATENT APPLICATIONS

This application is the U.S. National Phase of PCT Application No. PCT/US2022/070192, filed Jan. 14, 2022, which claims priority to and the benefit of U.S. Provisional Patent Application No. 63/137,369, filed Jan. 14, 2021, the entire contents of which are incorporated herein by reference.

BACKGROUND

Sipes are sometimes cut or molded into a tire tread to improve traction. Sipes may be formed in the ribs and blocks of a tire tread such that the tire tread can cut through water films on road surfaces. Sipes may also inhibit tire hysteresis loss and facilitate the deformation of ribs and blocks during use. A sipe pattern may be provided to a tire tread within one or more blocks, ribs, or lugs of the tire tread. In some embodiments, a sipe is included within the boundary of each tread element. Sipes may be provided straight across the tire tread, at a constant bias angle, or at a changing bias angle within the tire tread and the tread elements. Sipes may weaken the tread blocks, which may make them more susceptible to tearing or chunking. This may cause some tearing and chipping to occur at the edges of the tread blocks when the tire is subjected to side scrub.

SUMMARY

At least one embodiment relates to a tire tread. The tire tread includes a plurality of tread elements positioned on a tire tread surface so as to comprise a tread pattern. The tire tread also includes a plurality of grooves provided between the plurality of tread elements. A first set of sipes is provided to the tire tread, the first set of sipes extending from a longitudinal axis of the tire tread and toward a first edge of the tire tread at a first non-zero angle with respect to a lateral axis of the tire tread. A second set of sipes is also provided to the tire tread, the second set of sipes extending from the longitudinal axis and toward the first edge of the tire tread at a second non-zero angle with respect to the lateral axis, the second set of sipes intersecting the first set of sipes.

Another embodiment relates to a tire tread. The tire tread includes a first set of sipes and a second set of sipes. The first set of sipes extend from a longitudinal axis of the tire tread and toward a first edge of the tire tread at a first non-zero angle with respect to a lateral axis of the tire tread. The first set of sipes includes a first sipe and a second sipe where the second sipe is positioned at a first pitch distance from the first sipe. The second set of sipes extend from the longitudinal axis and toward the first edge of the tire tread at a second non-zero angle with respect to the lateral axis. The second set of sipes includes a third sipe and a fourth sipe positioned at a second pitch distance from the third sipe. The first non-zero angle is different from the second non-zero angle.

Another embodiment relates to a tire tread. The tire tread includes a first set of sipes and a second set of sipes. The first set of sipes extend from a longitudinal axis of the tire tread towards a first edge of the tire tread at a first non-zero angle with respect to a lateral axis of the tire tread. The first set of sipes includes a first sipe. The second set of sipes extend from the longitudinal axis and toward the first edge of the tire tread at a second non-zero angle with respect to the lateral axis. The second set of sipes include a second sipe, a third sipe positioned at a first pitch distance from the second sipe, and a fourth sipe positioned at a second pitch distance from the third sipe.

The summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

Figure 1:
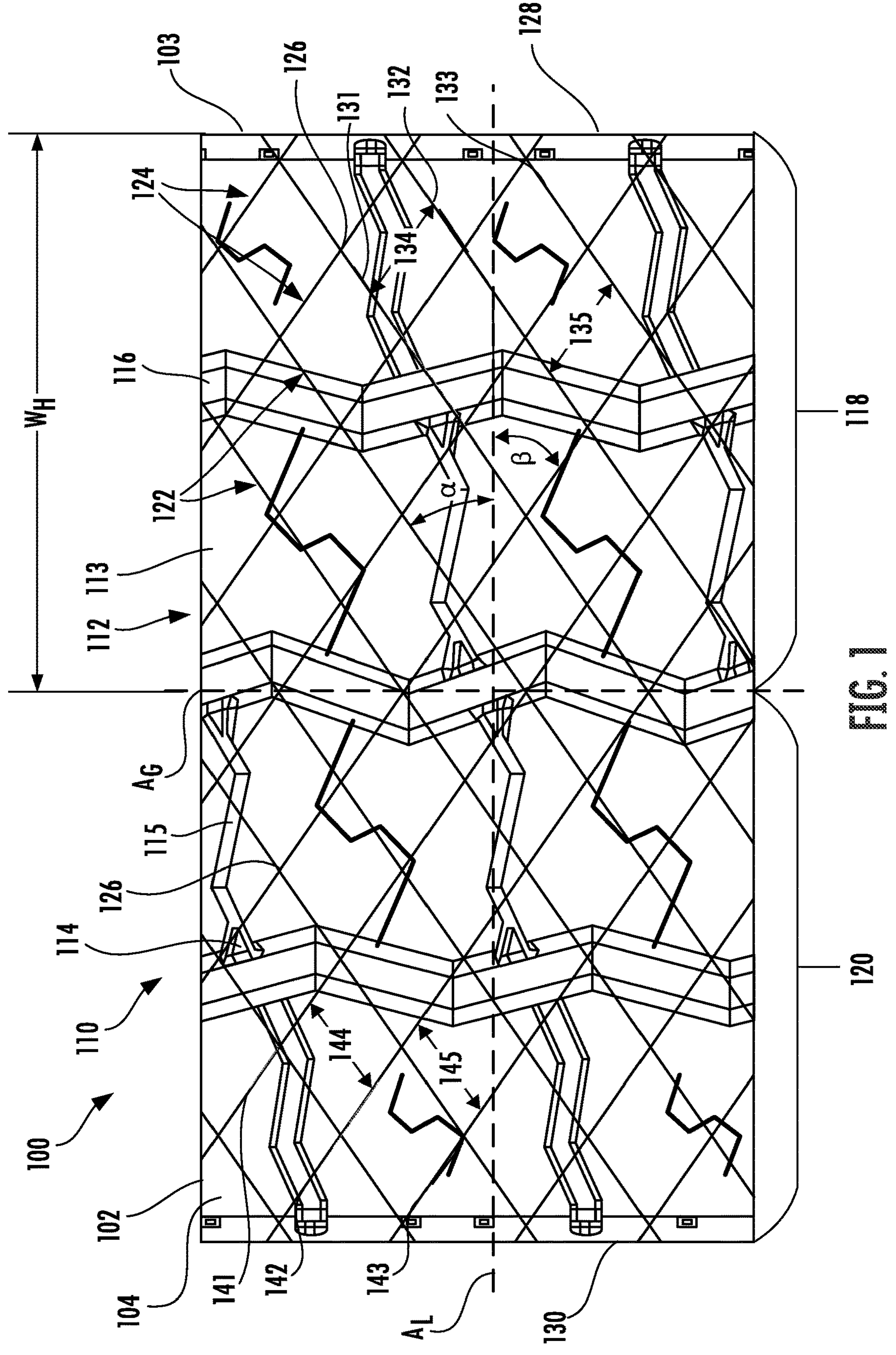
FIG. 1 is a top view of a tire tread, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the disclosure. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a tire tread is provided having a sipe pattern. In some embodiments, the sipe pattern is provided to a tire tread to increase the resistance of tire treads to chunking and cracking. The sipes may be provided as continuous cuts that extend through a portion or an entirety of the tire tread. In some embodiments, the sipe pattern includes sipes that intersect one another.

For ease of understanding this disclosure the following terms are disclosed:

"Aspect ratio" of the tire may refer to the ratio of its section height (SH) to its section width (Sw) multiplied by 100% for expression as a percentage.

"Asymmetric tread" may refer to a tire tread that has a tread pattern not symmetrical about the centerplane or an equatorial plane (EP) of the tire tread.

"Axial" and "lateral" may refer to lines or directions that extend across the tire tread perpendicularly to the lengthwise dimension of the tire tread. In some embodiments, when the tire tread is secured to a tire, the axial direction is parallel to an axis of rotation of the tire.

"Circumferential" and "longitudinal" may refer to lines or directions extending along the length of the tire tread. In some embodiments, when the tire tread is secured to a tire, the circumferential direction extends around the circumference of the tire tread, perpendicular to the axial (e.g., lateral) direction.

"Groove" may refer to an elongated void area in a tire tread that may extend circumferentially or laterally about the tire tread in a straight, curved, zigzag or any other suitable manner. Circumferentially and laterally extending grooves may sometimes have common portions. The "groove width" may be equal to a tread surface area occupied by a groove or groove portion, thus, the groove width may be its average width over its length. Grooves may be of varying depths in a tire. The depth of a groove may vary around the circumference of the tread, or the depth of one groove may be constant but vary from the depth of another groove in the tire. In some embodiments, the depth of the groove may be constant along the tire. If such narrow or wide grooves are of substantially reduced depth as compared to wide circumferential grooves which they interconnect, they may be regarded as forming "tie bars" tending to maintain a rib-like character in the tread region involved.

"Tire base" refers to the anchor point from which the height of grooves, ribs, sipes, tread elements, and lugs are referenced. In some embodiments, the tire base is located at the bottom of the deepest (e.g., tallest) groove. In some embodiments, the tire base is the highest circumferential point on a tire carcass prepared to be retreaded. In some embodiments, the tire base is the point nearest to the radial axis of the tire that can be seen by a user looking at the tire.

"Net-to-gross ratio" may refer to the total area of ground contacting tread elements between the lateral edges around the entire circumference of the tread divided by the gross area of the entire tread between the lateral edges.

"Non-directional tread" may refer to a tread that has no preferred direction of forward travel and is not required to be positioned on a vehicle in a specific wheel position or positions to ensure that the tread pattern is aligned with the preferred direction of travel. Conversely, a directional tread pattern may have a preferred direction of travel requiring specific wheel positioning.

"Radial" and "radially" may refer to directions radially toward or away from the axis of rotation of the tire tread when the tire tread is secured to a tire.

"Rib" may refer to a circumferentially extending strip of rubber on the tread with at least one circumferential groove and either a second such groove or a lateral edge, the strip being laterally undivided by full-depth grooves.

"Sipe" may refer to small slots that are molded into, cut into, or 3D printed into the tread elements of the tire that subdivide the tread surface and may improve traction.

"Tread element" or "traction element" may refer to a rib, a lug, or a block element.

"Lugs" or "major features" may refer to the section of the tread element that make contact with a surface.

"Connecting blocks" or "minor features" may refer to the section of the tread element that extends above the tire base but does not make contact with a surface when the tread elements are new (e.g., not used on a road, not used on the surface, etc.).

"Voids" may refer to spaces that are located between the lugs.

FIG. 1 is a front view of a portion of a tire tread 100. In some embodiments, the tire tread 100 is separated from a tire. For example, the tire tread 100 may be used for retread operations. The tire tread 100 includes a tread base 102, the tread base defining both a planar rear surface 103 structured for coupling to a tire carcass and a road contact surface 104 positioned opposite to the planar rear surface 103. The tire tread 100 further includes a tread pattern 110. The tread pattern 110 comprises a plurality of features, some of the plurality of features comprising a portion of the road contact surface 104. The tire tread 100 further defines a lateral axis $A_L$ and a longitudinal axis $A_G$. The lateral axis $A_L$ extends across a width of the tire tread 100, perpendicular to both a length of the tire tread 100 and the longitudinal axis $A_G$. When the tire tread 100 is coupled to a tire carcass, the lateral axis $A_L$ is parallel to a rotational (e.g., axial) axis of the tire and the longitudinal axis $A_G$ is parallel to a circumferential axis of the tire. Furthermore, the tire tread 100 defines a half width $W_H$ (FIG. 1) measured from the longitudinal axis $A_G$ of the tire tread 100 to an axial end (e.g., edge, etc.) thereof.

The tire tread 100 includes a plurality of tread elements 112 positioned on the tread base 102, at least some of the tread elements 112 including a portion of the road contact surface 104. In some embodiments, the tire tread 100 is molded with the tire. In some embodiments, the tire tread 100 is molded separately from the tire and later coupled to an outer surface of the tire (e.g., via an adhesive, curing, fusion bonding, heat bonding, vulcanization, etc.).

The plurality of tread elements 112 may include a plurality of circumferential lugs 113 separated by voids 114. A connecting block 115 may be positioned in the void 114 between each of the lugs 113 and coupled to each of the adjacent lugs 113. A plurality of circumferential grooves 116 may be provided between each of the plurality of tread elements 112.

Figure 3:
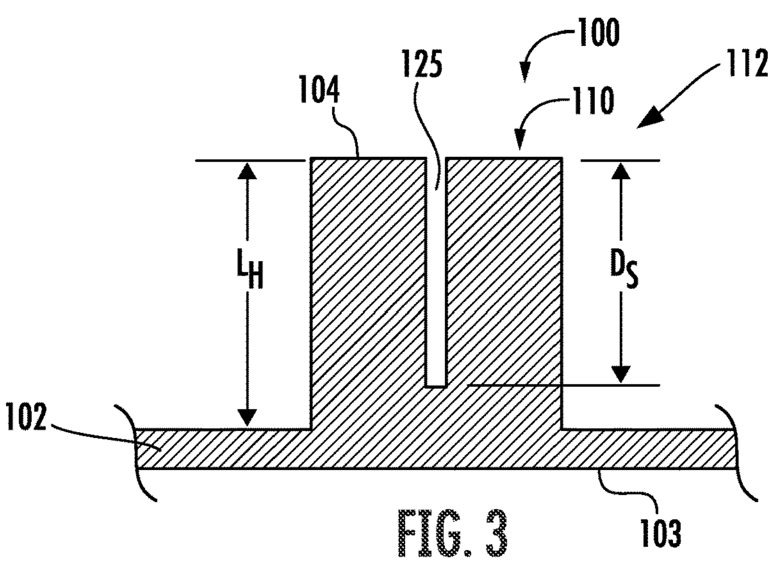
FIG. 3 is a cross-sectional view of a portion of the tire tread of FIG. 1, according to an example configuration.
Figure 4:
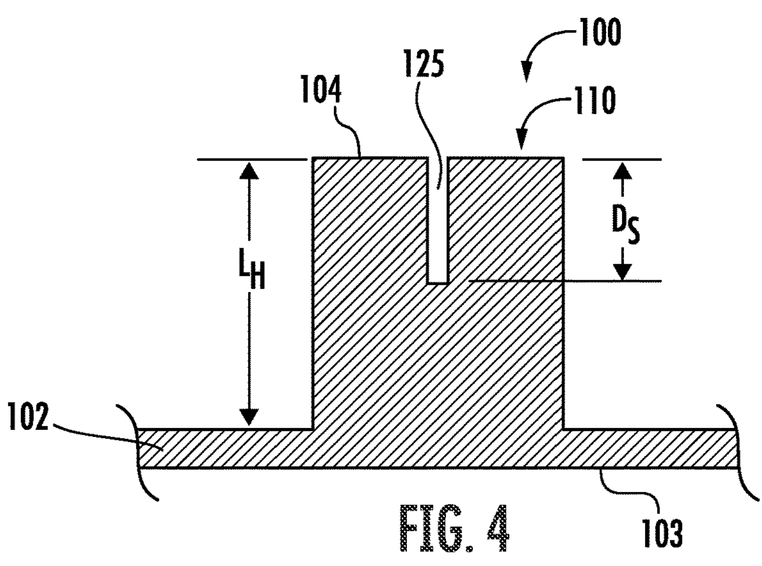
FIG. 4 is a cross-sectional view of a portion of the tire tread of FIG. 1, according to another example configuration.
Figure 5:
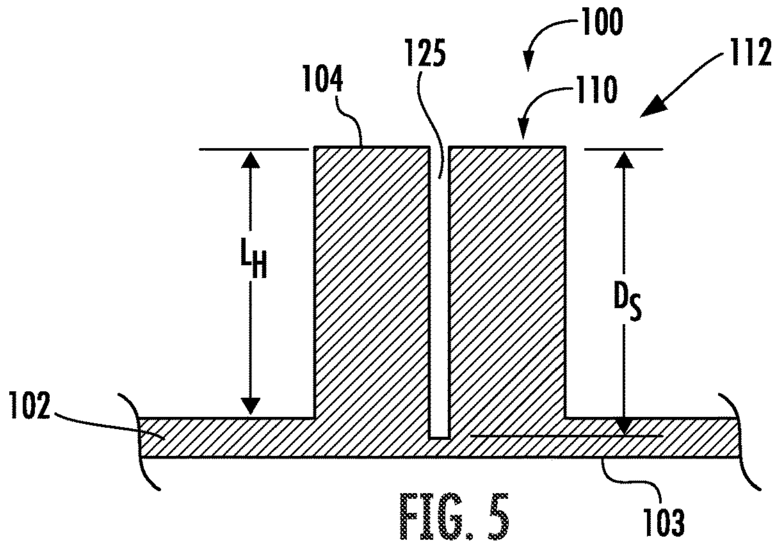
FIG. 5 is a cross-sectional view of a portion of the tire tread of FIG. 1, according to another example configuration.

Referring now to FIGS. 3-5, a side, cross-sectional view of a portion of the tire tread 100 is shown. The portion of the tire tread 100 includes a portion of the tread base 102 and a tread element 112. The tread element 112 defines a height $L_H$ as a distance between the tread base 102 and the road contact surface 104.

It is to be appreciated that while the tire tread 100 is shown as having a particular tread pattern 110, the tire tread 100 may have any suitable tread pattern. For example, the plurality of tread elements 112 may be axially or circumferentially positioned on a surface of the tire tread 100 and include straight grooves, curved grooves, zig zag grooves, a pitch pattern, a non-directional tread pattern, a symmetric tread pattern, or an asymmetric tread pattern. Furthermore, the tire tread 100 may have any suitable aspect ratio or net-to-gross ratio.

Referring again to FIG. 1, the tire tread 100 includes a first portion 118 (e.g., left portion, exterior portion, axial end, etc.) and a second portion 120 (e.g., right portion, interior portion, axial end, etc.) separated by the longitudinal axis $A_G$. When the tire tread 100 is attached to a tire, the longitudinal axis $A_G$ extends parallel to a rotational (e.g., circumferential, etc.) direction of the tire.

The tire tread 100 includes a first set of sipes 122 extending from the longitudinal axis $A_G$ and toward a first edge 128 (e.g., axial end, etc.) at a first non-zero angle α with respect to the lateral axis $A_L$. In some embodiments, the first non-zero angle α is between 5-40 degrees, inclusive. The tire tread 100 may also include a second set of sipes 124 extending from the longitudinal axis $A_L$ toward the first edge 128 at a second non-zero angle β with respect to the lateral axis $A_L$. In some embodiments, the second non-zero angle β is between negative 5-40 degrees, inclusive (−5-−40 degrees). The first set of sipes 122 and the second set of sipes 124 (collectively referred to herein as "the sipes 125") may be molded into the tire tread 100, for example during a molding operation of the tire tread 100. In some embodiments, the sipes 125 are formed in the tire tread 100 after molding of the tire tread 100. In some embodiments, the first set of sipes 122 and the second set of sipes 124 intersect one another at a plurality of intersection points 126. In some embodiments, at least one of the plurality of intersection points 126 is on one of the lugs 113. In some embodiments, at least one of the plurality of intersection points 126 is on the connecting block 115. In some embodiments, at least one of the plurality of intersection points 126 is in the groove 116. In some embodiments, the tire tread 100 includes either the first set of sipes 122 or the second set of sipes 124, but not both.

Figure 2:
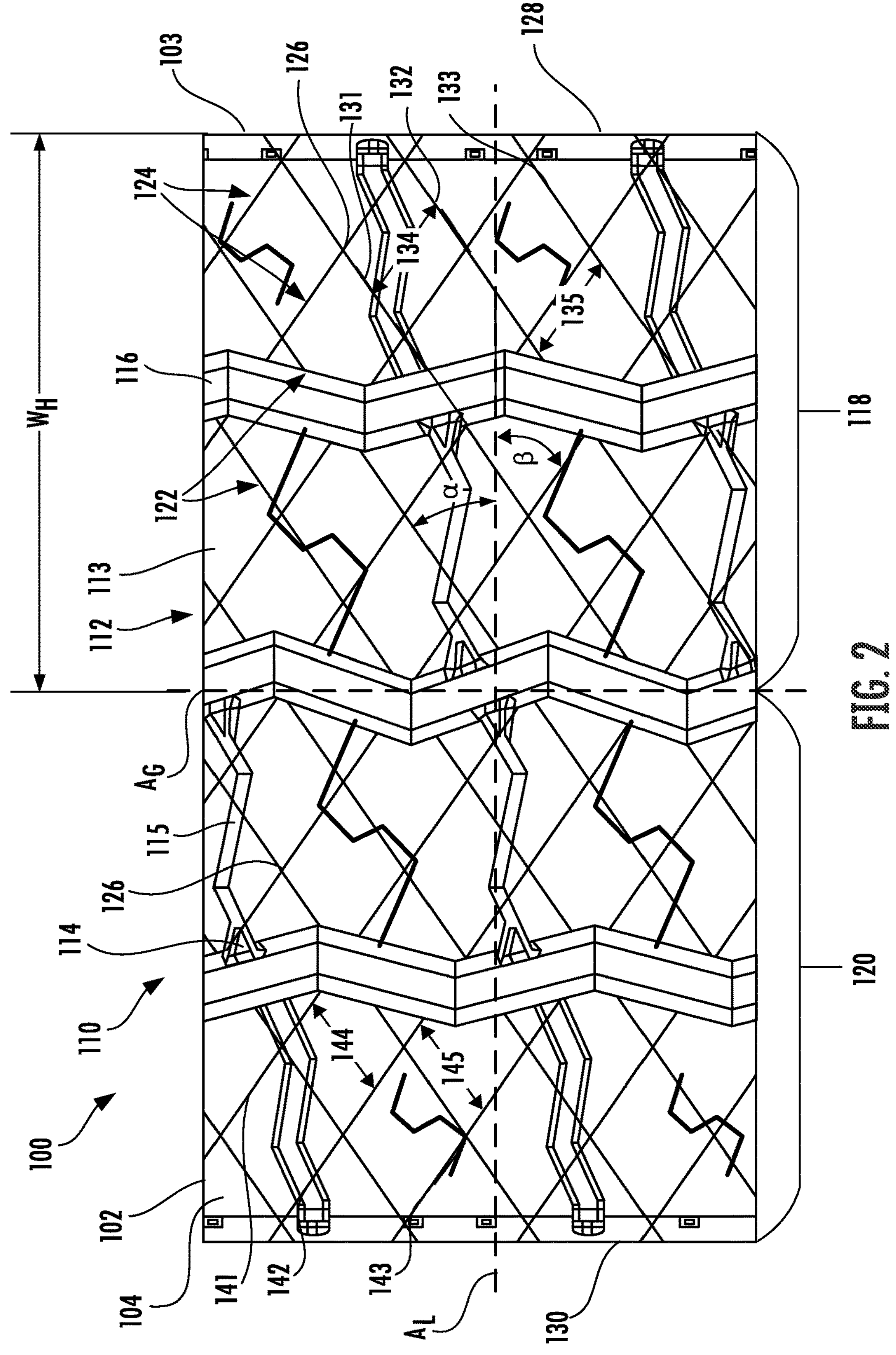
FIG. 2 is a top view of the tire tread of FIG. 1, according to an example configuration.

Referring now to FIG. 2, a top view of the tire tread 100 is shown, according to an example configuration. The tire tread 100 shown in FIG. 1 is similar to the tire tread 100 shown in FIG. 2. A difference between the tire tread 100 shown in FIG. 1 and the tire tread 100 shown in FIG. 2 is that the first set of sipes 122 and the second set of sipes 124 in FIG. 2 are shallower and do not extend into the bottom of the groove 116. As outlined below with reference to FIGS. 3-5, the first set of sipes 122 and the second set of sipes 124 shown in FIG. 2 extend into the lugs 113 by a distance that is less than a height of the lugs 113. The first set of sipes 122 and the second set of sipes 124 may be shallow and extend into the lugs 113 by a distance less than half of the height of the lugs 113. In some embodiments, first set of sipes 122 and the second set of sipes 124 extend into the lugs 113 at different heights.

Referring to FIGS. 3-5, each of the sipes 125 defines a sipe depth $D_S$. The sipe depth $D_S$ is defined as a distance between the road contact surface 104 and a bottom of the sipe 125 opposite to the road contact surface 104. In some embodiments, the sipe depth $D_S$ is greater than 50% of the height $L_H$ of each of the plurality of tread elements 112, the height $L_H$ being measured from the road contact surface 104 to the tread base 102 (from the road contact surface 104 to the bottom of the groove 116). In some embodiments, such as shown in FIG. 3, each of the sipes 125 defines a sipe depth $D_S$ in a range of 60% to 100% of the height $L_H$ of the plurality of tread elements 112, inclusive of all ranges and values therebetween. In some embodiments, such as shown in FIG. 4, each of the sipes 125 defines a sipe depth $D_S$ of less than 50% of the height $L_H$ of the plurality of tread elements 112. For example, the sipes 125 may be shallow sipes have a sipe depth $D_S$ of between 20-30% of the height $L_H$. In some embodiments, such as shown in FIG. 5, each of the sipes 125 defines a sipe depth $D_S$ of greater than 100% of the height $L_H$ of the plurality of tread elements 112 (e.g., about 101% to 115% of the height $L_H$ of the plurality of tread elements 112 inclusive of all ranges and values therebetween). In other words, the sipes 125 may extend into the tread base 102.

Referring again to FIG. 1, the first set of sipes 122 includes a first sipe 131, a second sipe 132, and a third sipe 133. Each of the first set of sipes 122 may be linear (e.g., straight). In some embodiments, each of the first set of sipes 122 may have a curvature. Each of the first sipe 131, the second sipe 132, and the third sipe 133 may be positioned parallel to one another at any suitable pitch or distance therefrom. Specifically, the first sipe 131 and the second sipe 132 are positioned apart by a first pitch distance 134 and the second sipe 132 and the third sipe 133 are positioned apart a second pitch distance 135. In some embodiments, the first pitch distance 134 and the second pitch distance 135 is between 5-40 millimeters (mm), inclusive. In some embodiments, the first pitch distance 134 and the second pitch distance 135 are different from one another. For example, as shown in FIGS. 11-14, the first pitch distance 134 is greater than the second pitch distance 135. In some embodiments, the first pitch distance 134 is between 1-1.5 inches, inclusive, and the second pitch distance 135 is between 0.5-0.75 inches, inclusive.

Figure 12:
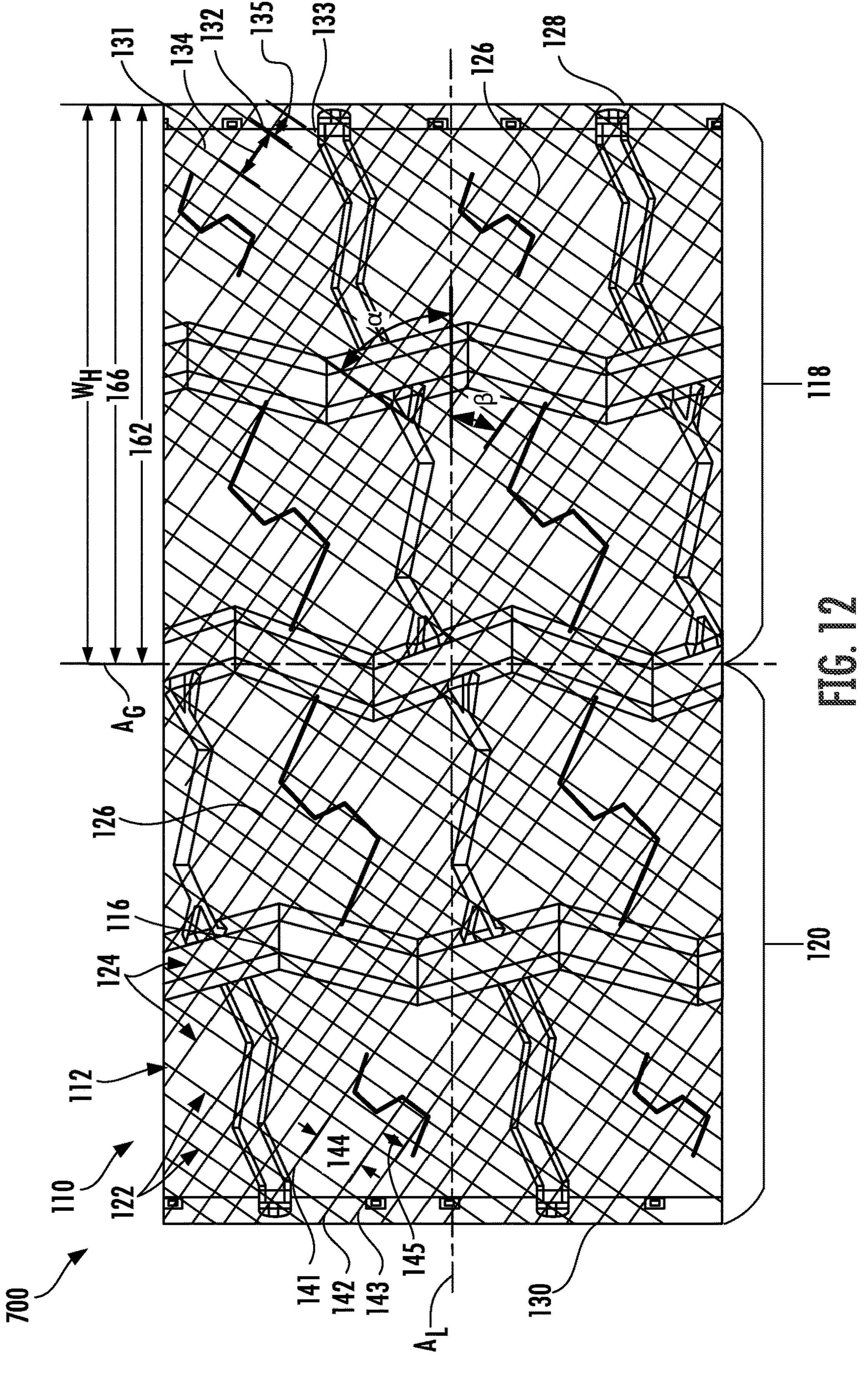
FIG. 12 is a top view of a tire tread, according to yet another example embodiment.
Figure 13:
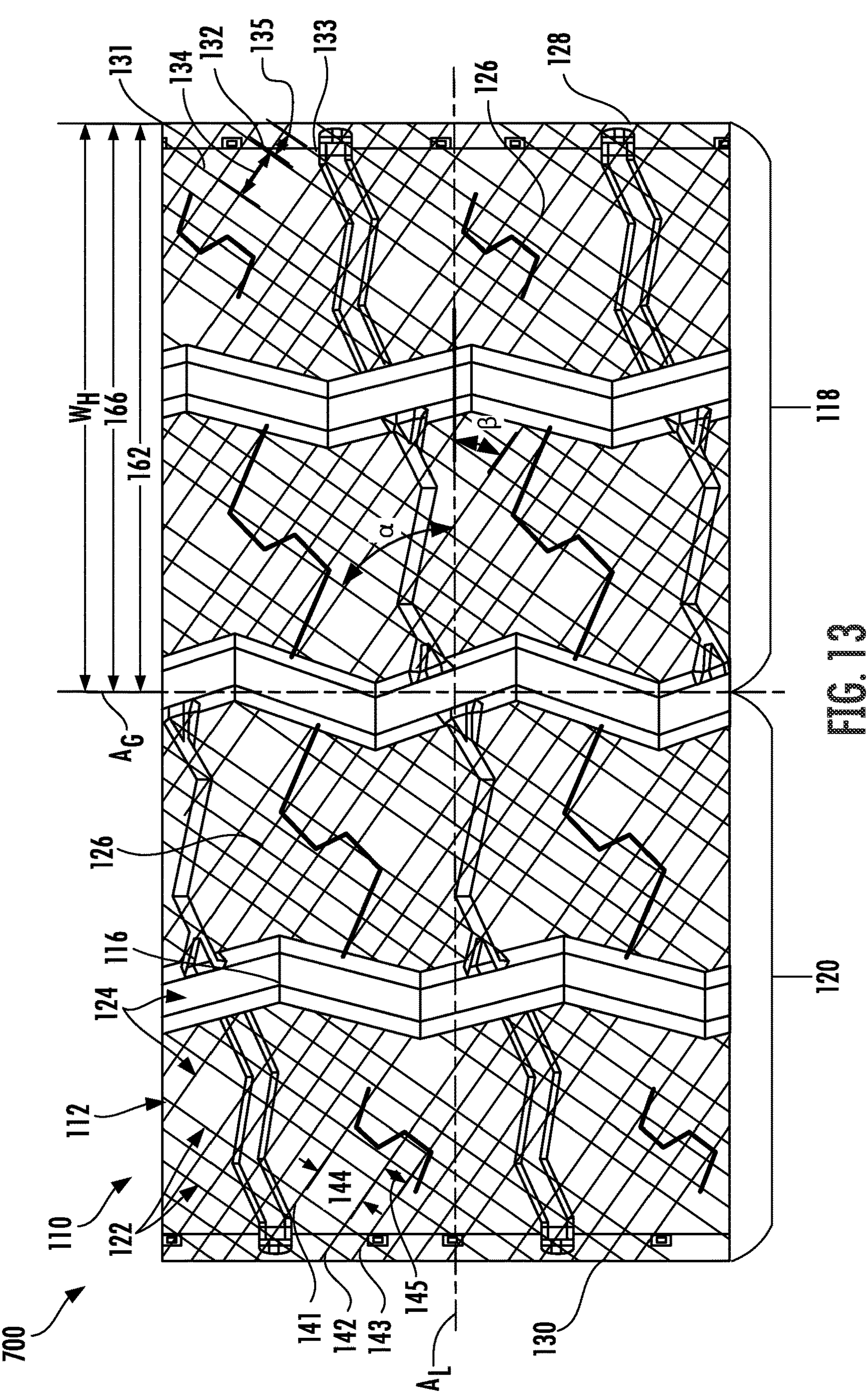
FIG. 13 is a top view of the tire tread of FIG. 12, according to an example configuration.

The second set of sipes 124 includes a first sipe 141, a second sipe 142, and a third sipe 143. Each of the first sipe 141, the second sipe 142, and the third sipe 143 may be positioned parallel to one another at any suitable pitch or distance therefrom. Specifically, the first sipe 141 and the second sipe 142 are positioned apart by a first pitch distance 144 and the second sipe 142 and the third sipe 143 are positioned apart by a second pitch distance 145. In some embodiments, the first pitch distance 144 and the second pitch distance 145 are between 5-40 millimeters (mm), inclusive. In some embodiments, the first pitch distance 144 and the second pitch distance 145 are different from one another. For example, as shown in FIGS. 12 and 13, the first pitch distance 144 is greater than the second pitch distance 145. In some embodiments, the first pitch distance 144 is between 1-1.5 inches, inclusive, and the second pitch distance 145 is between 0.5-0.75 inches, inclusive. In some embodiments, the first pitch distance 134 and the first pitch distance 144 are substantially equal (given manufacturing tolerances and limitations) and the second pitch distance 135 and the second pitch distance 145 are substantially equal. In some embodiments, the first set of sipes 122 and the second set of sipes 124 are unequally spaced apart, forming a tartan-esque or plaid pattern having rectangles and/or diamonds of unequal sizes and shapes between the first set of sipes 122 and the second set of sipes 124.

Figure 11:
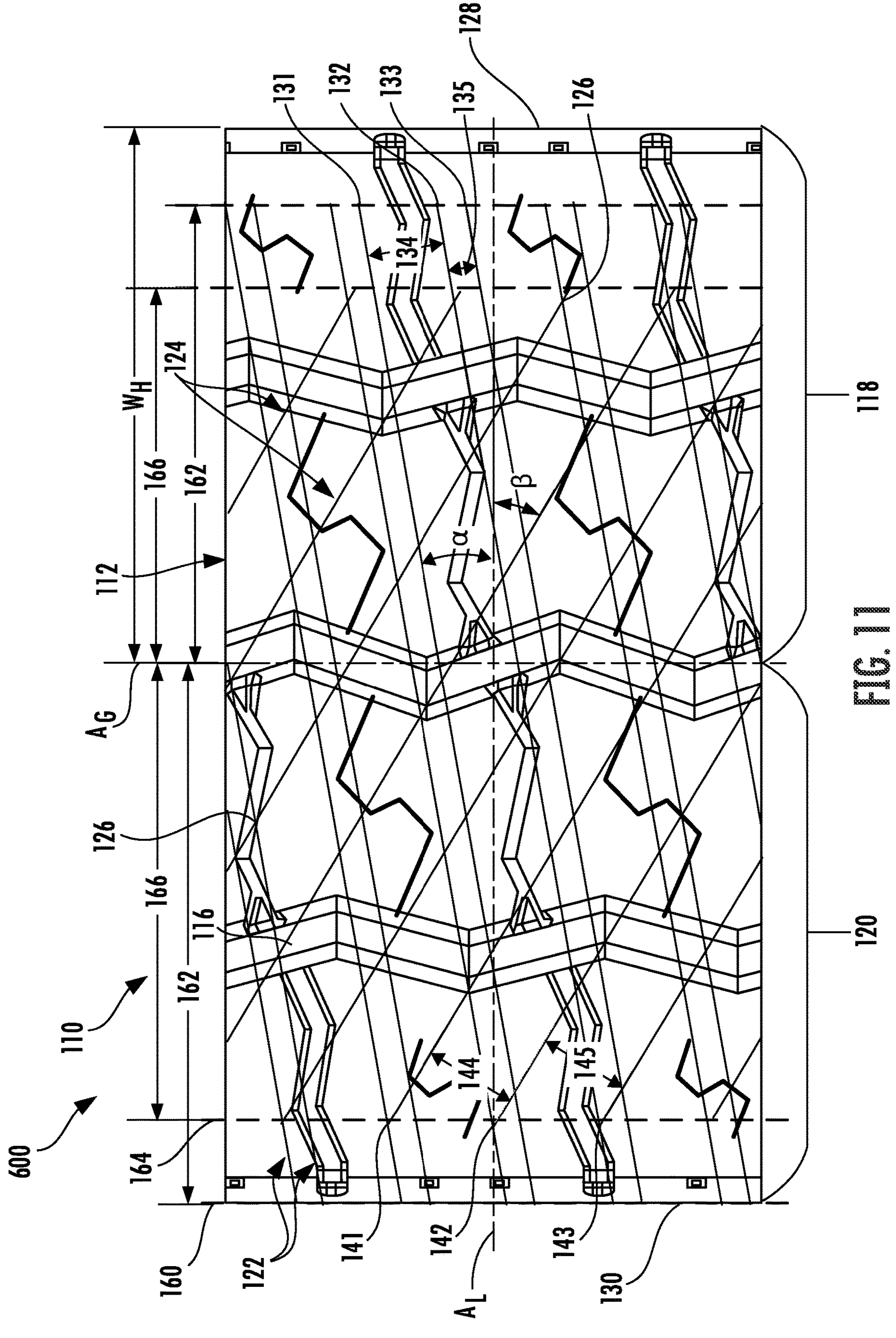
FIG. 11 is a top view of a tire tread, according to yet another example embodiment.

While the first set of sipes 122 and the second set of sipes 124 are described herein with reference to the first portion 118 for brevity, it should be understood that the sipes 125 may extend through the longitudinal axis $A_G$ and continue onto the second portion 120 of the tire tread 100. In some embodiments, the sipes 125 form a pattern on the first side that is continued onto the second portion 120. In some embodiments, the first set of sipes 122 forms a pattern independent from the second set of sipes 124 such that both the first set of sipes 122 and the second set of sipes 124 form independent patterns that continue across the longitudinal axis $A_G$. For example, as shown in FIG. 11, the first set of sipes 122 and the second set of sipes 124 extend between the first edge 128 and a second edge 130 of the tire tread 100, beginning and ending at different points. In some embodiments, the sipes 125 are mirrored over the longitudinal axis $A_G$, such as is shown in FIG. 1.

Figure 6:
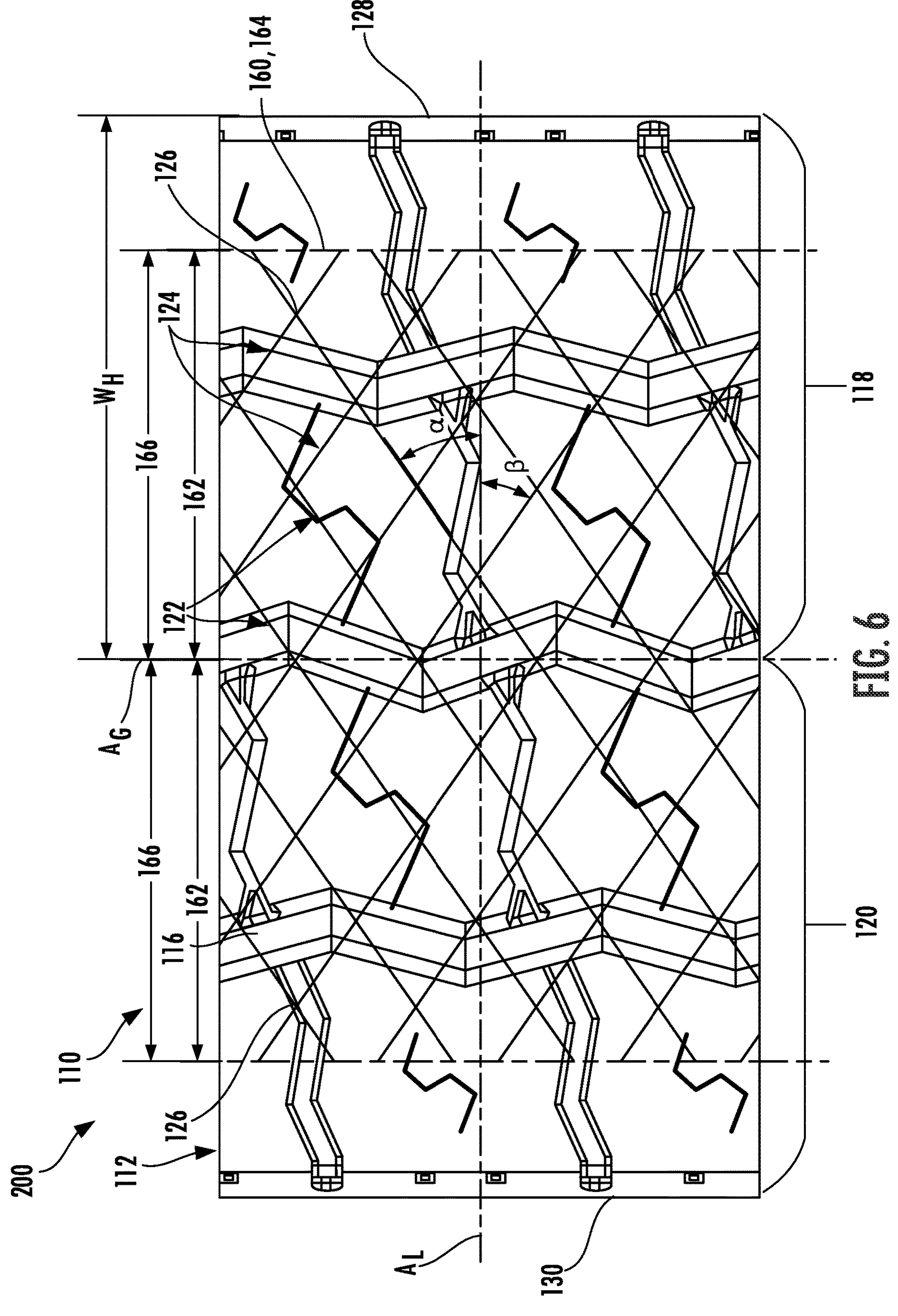
FIG. 6 is a top view of a tire tread, according to another example embodiment.
Figure 7:
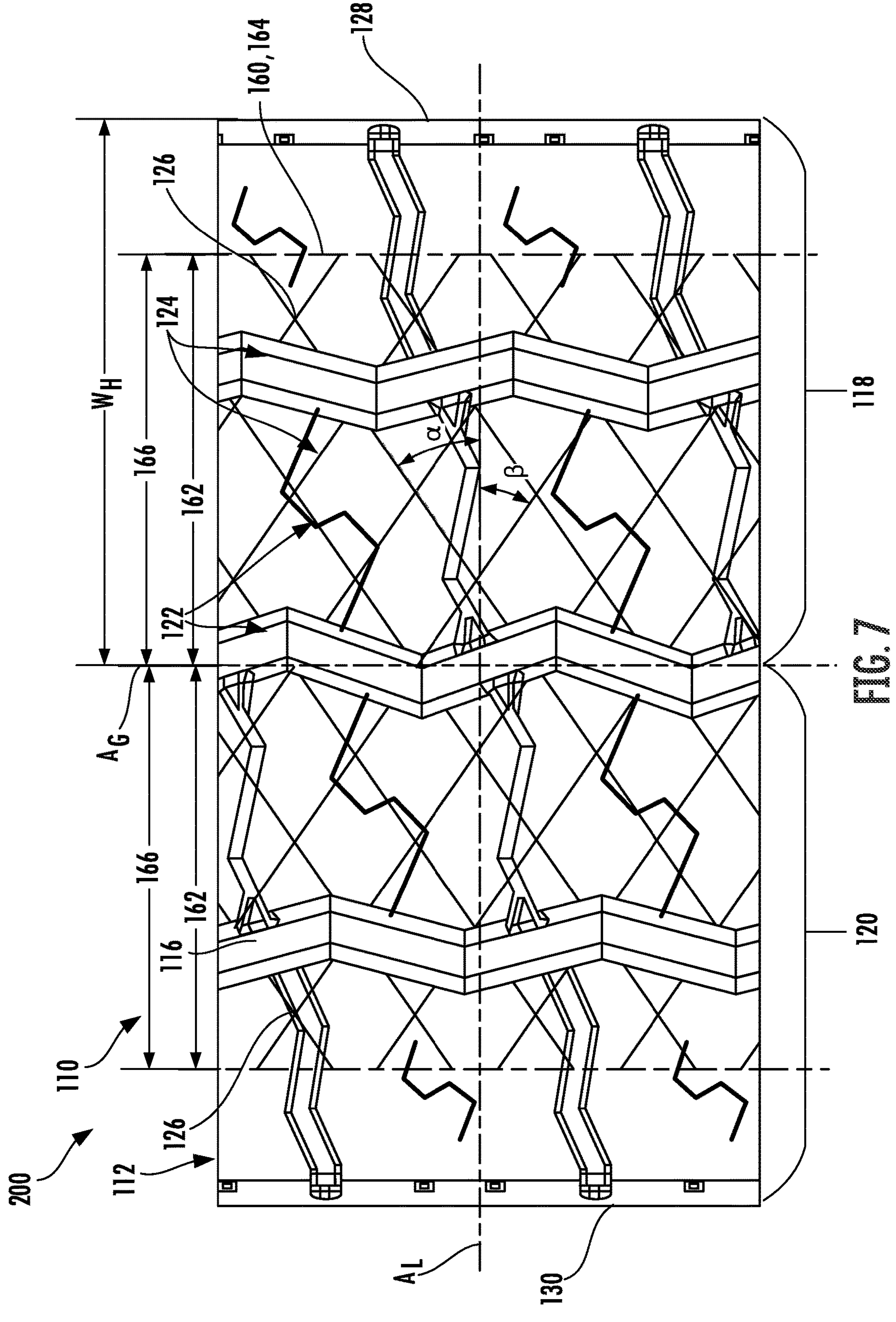
FIG. 7 is a top view of the tire tread of FIG. 6, according to an example configuration.
Figure 8:
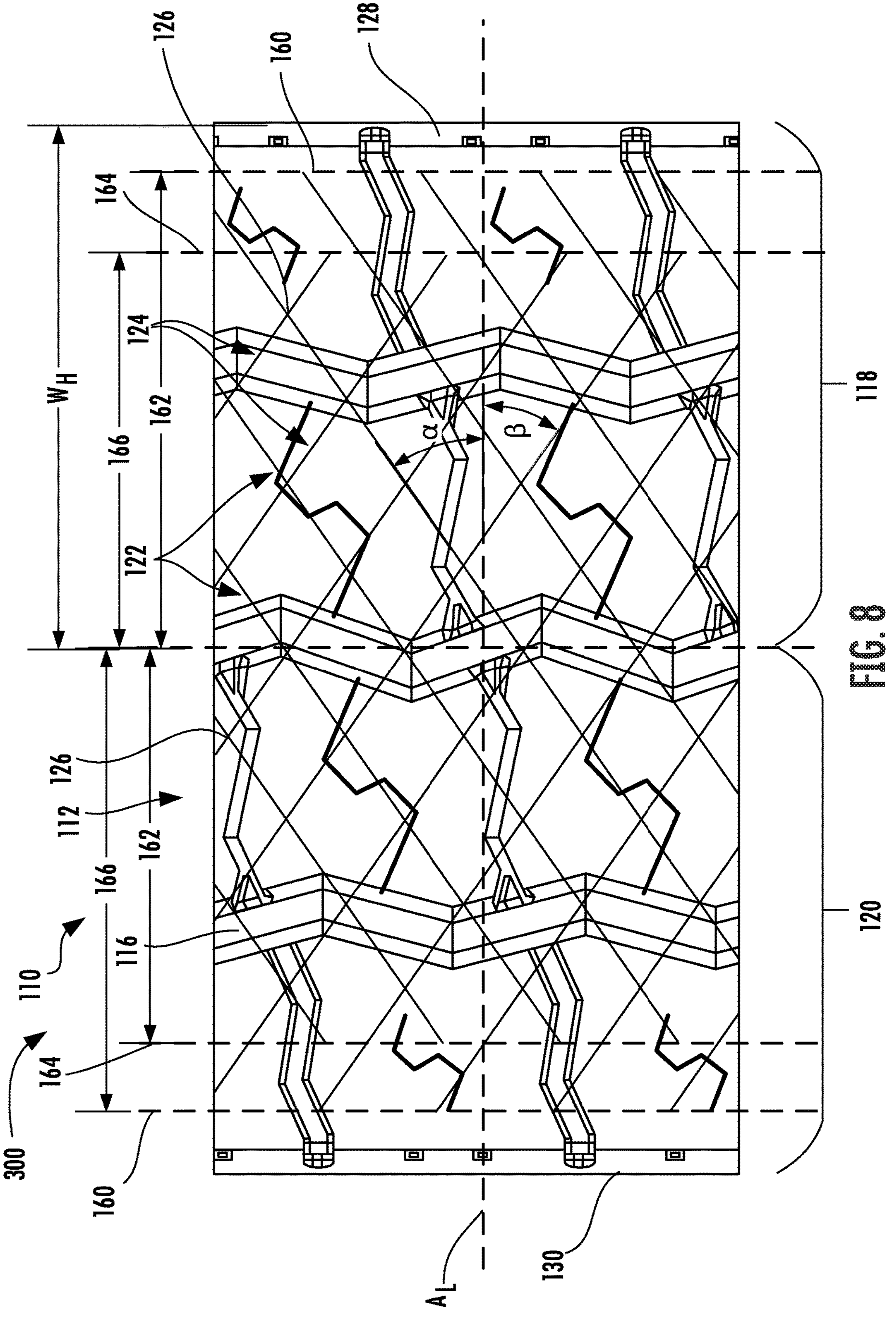
FIG. 8 is a top view of a tire tread, according to yet another example embodiment.

Referring now to FIGS. 6-15, various configurations of the sipes 125 are shown according to various embodiments. Referring specifically to FIG. 6, a tire tread 200 is shown. The tire tread 200 is similar to the tire tread 100. Accordingly, similar numbering is used to denote similar parts. A difference between the tire tread 100 and the tire tread 200 is the configuration of the sipes 125. The tire tread 200 includes the first set of sipes 122 and the second set of sipes 124 extending between the longitudinal axis $A_G$ and the first edge 128. The first set of sipes 122 extends from the longitudinal axis $A_G$ and terminates at a first sipe plane 160, the first sipe plane 160 being distanced from the longitudinal axis $A_L$ at a first sipe distance 162. The first sipe distance 162 may be defined as a percentage of the half-width $W_H$. For example, as shown in FIG. 6, the first sipe distance 162 is approximately 60% of the half width $W_H$. Similar to the first set of sipes 122, the second set of sipes 124 extends from the longitudinal axis $A_G$ and terminates at a second sipe plane 164, the second sipe plane 164 distanced from the longitudinal axis $A_L$ at a second sipe distance 166. As shown in FIG. 6, the first sipe plane 160 and the second sipe plane 164 are co-planar such that the first set of sipes 122 and the second set of sipes 124 terminate along the same plane. In other words, the first set of sipes 122 and the second set of sipes 124 extend across a middle portion of the tire tread 200 but do not extend to the edges (e.g., the first edge 128 and the second edge 130) of the tire tread 100. In some embodiments, the longevity of the tire tread 200 may be improved because the sipes do not extend all the way to the first edge 128 and the second edge 130, which reduces localized stress along the edges 128, 130. The first set of sipes 122 and the second set of sipes 124 further extend from the longitudinal axis $A_G$ and toward the second edge 130, terminating at the first sipe plane 160 (e.g., the second sipe plane 164) positioned the first sipe distance 162 (e.g., the second sipe distance 166) away from the longitudinal axis $A_G$. The intersection points 126 are positioned along the longitudinal axis $A_G$ such that the sipes 125 are symmetrical about the longitudinal axis $A_G$. In some embodiments, the intersection points 126, and thus the sipe pattern, may be shifted toward the first edge 128 or the second edge 130 to form an asymmetrical sipe pattern relative to the longitudinal axis $A_G$ (FIG. 8).

Turning now to FIG. 7, a top view of the tire tread 200 of FIG. 6 is shown, according to an example configuration. The tire tread 200 of FIG. 7 is similar to the tire tread 200 of FIG. 6. A difference between the tire tread 200 of FIG. 6 and the tire tread of FIG. 7 is that the groove 116 of the tire tread 200 of FIG. 7 includes a groove depth (e.g., height $L_H$) that is greater than a depth (e.g., sipe depth $D_S$) of each of the sipes of the first set of sipes 122 and greater than a depth of each of the sipes of the second set of sipes 124 such that each of the first sipe 131 (e.g., first sipe 141), the second sipe 132 (e.g., second sipe 142), a third sipe 133 (e.g., third sipe 143), are discontinuous at the groove 116. Each of the sipes 125 may be cut such that each of the sipes 125 extends linearly across the groove 116 without extending into a bottom of the groove 116.

Turning now to FIG. 8, a tire tread 300 is shown, according to an example embodiment. The tire tread 300 is similar to the tire tread 100. Accordingly, similar numbering is used to denote similar parts. A difference between the tire tread 100 and the tire tread 300 is the configuration of the sipes 125.

Specifically, the first sipe distance 162 is different from the second sipe distance 166 such that the first set of sipes 122 do not terminate at the same plane as the second set of sipes 124. For example, on the first portion 118, the first sipe distance 162 is approximately 90% of the half width $W_H$ and the second sipe distance 166 is approximately 60% of the half width $W_H$. On the second portion 120, the first sipe plane 160 is positioned the second sipe distance 166 from the longitudinal axis $A_G$ and the second sipe plane 164 is positioned the first sipe distance 162 from the longitudinal axis $A_G$. Accordingly, the sipes 125 are symmetrical about the longitudinal axis $A_G$ and the intersection points 126 lie on the longitudinal axis $A_G$. The tire tread 300 may be a directional tire tread as indicated by the sipes 125 on the first portion 118 that extend between the first sipe plane 160 and the second sipe plane 164 and as indicated by the sipes 125 on the second portion 120 positioned between the first sipe plane 160 and the second sipe plane 164.

Figure 9:
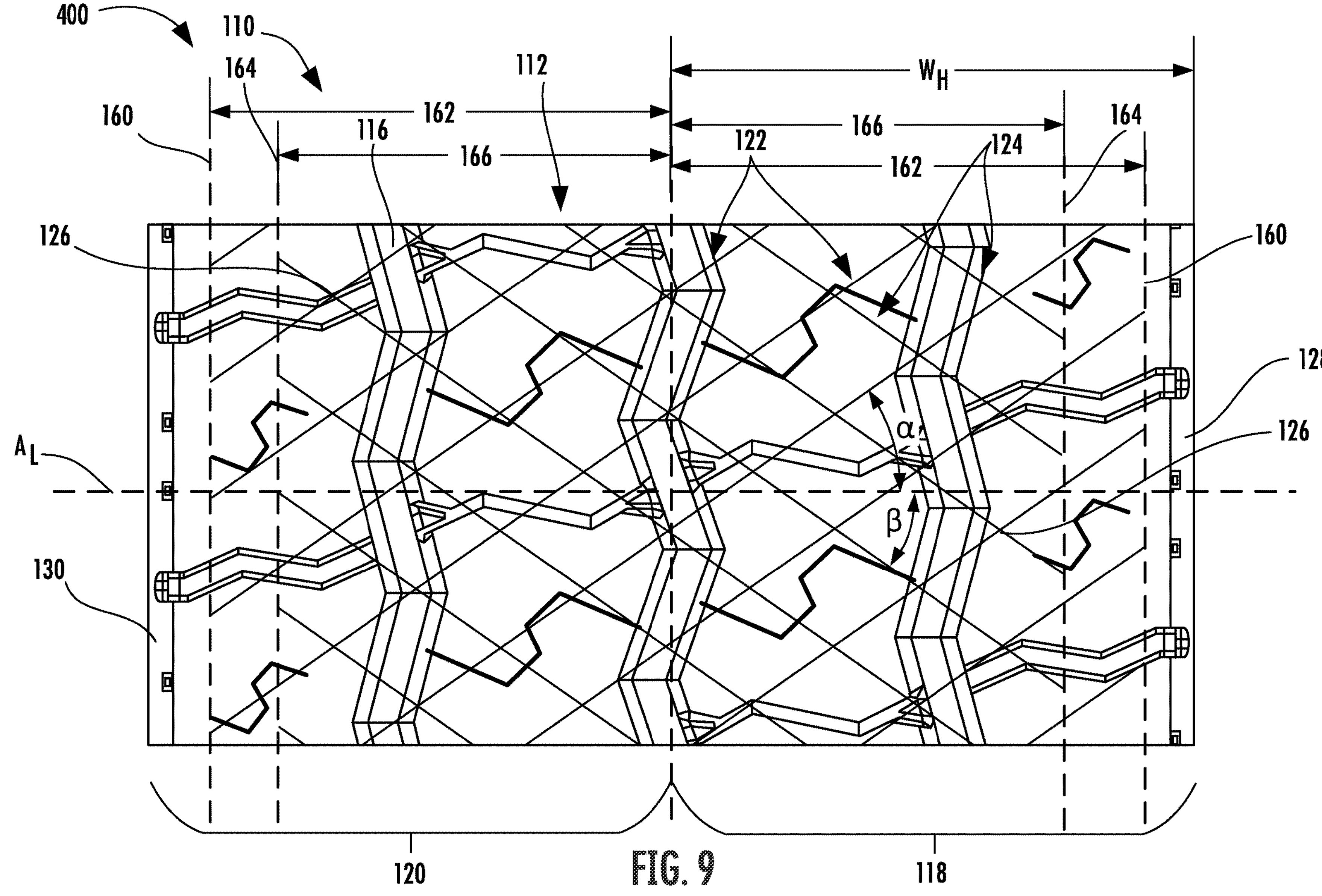
FIG. 9 is a top view of a tire tread, according to yet another example embodiment.

Turning now to FIG. 9, a tire tread 400 is shown, according to an example embodiment. The tire tread 400 is similar to the tire tread 100. Accordingly, similar numbering is used to denote similar parts. A difference between the tire tread 100 and the tire tread 400 is the configuration of the sipes 125. Specifically, the sipes 125 of the tire tread 400 are asymmetrical. On the first portion 118 of the tire tread 400, the first sipe distance 162 is greater than the second sipe distance 166. Similarly, on the second portion 120, the first sipe distance 162 is greater than the second sipe distance 166.

Figure 10:
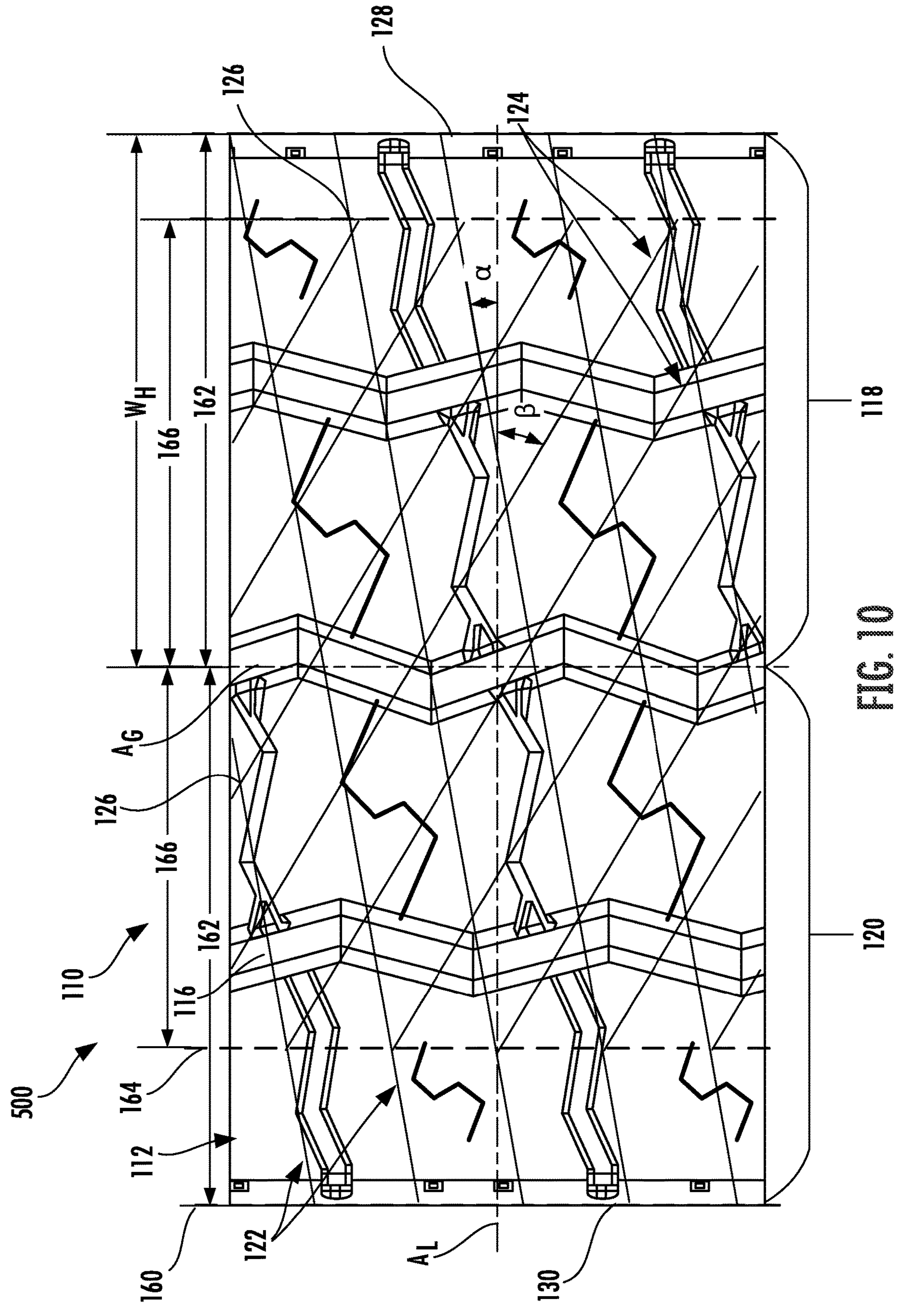
FIG. 10 is a top view of a tire tread, according to yet another example embodiment.

Turning now to FIG. 10, a tire tread 500 is shown, according to an example embodiment. The tire tread 500 is similar to the tire tread 100. Accordingly, similar numbering is used to denote similar parts. A difference between the tire tread 100 and the tire tread 500 is the configuration of the sipes 125. Specifically, the first angle $\alpha$ is different from the second angle $\beta$. The first angle $\alpha$ is less (e.g., the absolute value of the first angle $\alpha$ is less) than the second angle $\beta$ such that a plurality of non-rhombus parallelagrams are formed the sipes 125 across the tire tread 500. Further, no intersection points lie on the longitudinal axis $A_G$. In some embodiments, the first angle $\alpha$ is greater than the second angle $\beta$.

Turning now to FIG. 11, a tire tread 600 is shown, according to an example embodiment. The tire tread 600 is similar to the tire tread 100. Accordingly, similar numbering is used to denote similar parts. A difference between the tire tread 100 and the tire tread 600 is the configuration of the sipes 125. Specifically, the first pitch distance 134 is different from the second pitch distance 135 and the first pitch distance 144 is substantially equal to the second pitch distance 145. Further, the first set of sipes 122 extends a different distance on both the first portion 118 and the second portion 120. As shown, on the second portion 120, the first set of sipes 122 extends all the way to the second edge 130. However, on the first portion 118, the first sipe distance 162 is less than 100% of the half width $W_H$. The second set of sipes 124 is similar in that the second set of sipes 124 extend a different second sipe distance 166 on both the first portion 118 and the second portion 120.

Turning now to FIG. 12, a tire tread 700 is shown, according to an example embodiment. The tire tread 700 is similar to the tire tread 100. Accordingly, similar numbering is used to denote similar parts. A difference between the tire tread 100 and the tire tread 700 is the configuration of the sipes 125. Specifically, the first pitch distance 134 is different from the second pitch distance 135 and the first pitch distance 144 is different from the second pitch distance 145. However, the first pitch distance 134 is substantially equal to the first pitch distance 144 and the second pitch distance 135 is substantially equal to the second pitch distance 145. The first angle α and the second angle β are also shown as being different from one another. While both the first set of sipes 122 and the second set of sipes 124 are shown as extending all the way across the tire tread 700 from the first edge 128 to the second edge 130, it should be understood that most any first sipe distance 162 and second sipe distance 166 may be realized.

Turning now to FIG. 13, a top view of the tire tread 700 of FIG. 12 is shown, according to an example configuration. The tire tread 700 of FIG. 13 is similar to the tire tread 700 of FIG. 12. A difference between the tire tread 700 of FIG. 12 and the tire tread 700 of FIG. 13 is that the groove 116 of the tire tread 700 of FIG. 13 includes a groove depth (e.g., height $L_H$) that is greater than a depth (e.g., sipe depth $D_S$) of each of the sipes of the first set of sipes 122 and greater than a depth of each of the sipes of the second set of sipes 124 such that each of the first sipe 131 (e.g., first sipe 141), the second sipe 132 (e.g., second sipe 142), a third sipe 133 (e.g., third sipe 143), are discontinuous at the groove 116. Each of the sipes 125 may be cut such that each of the sipes 125 extends linearly across the groove 116 without extending into a bottom of the groove 116.

Figure 14:
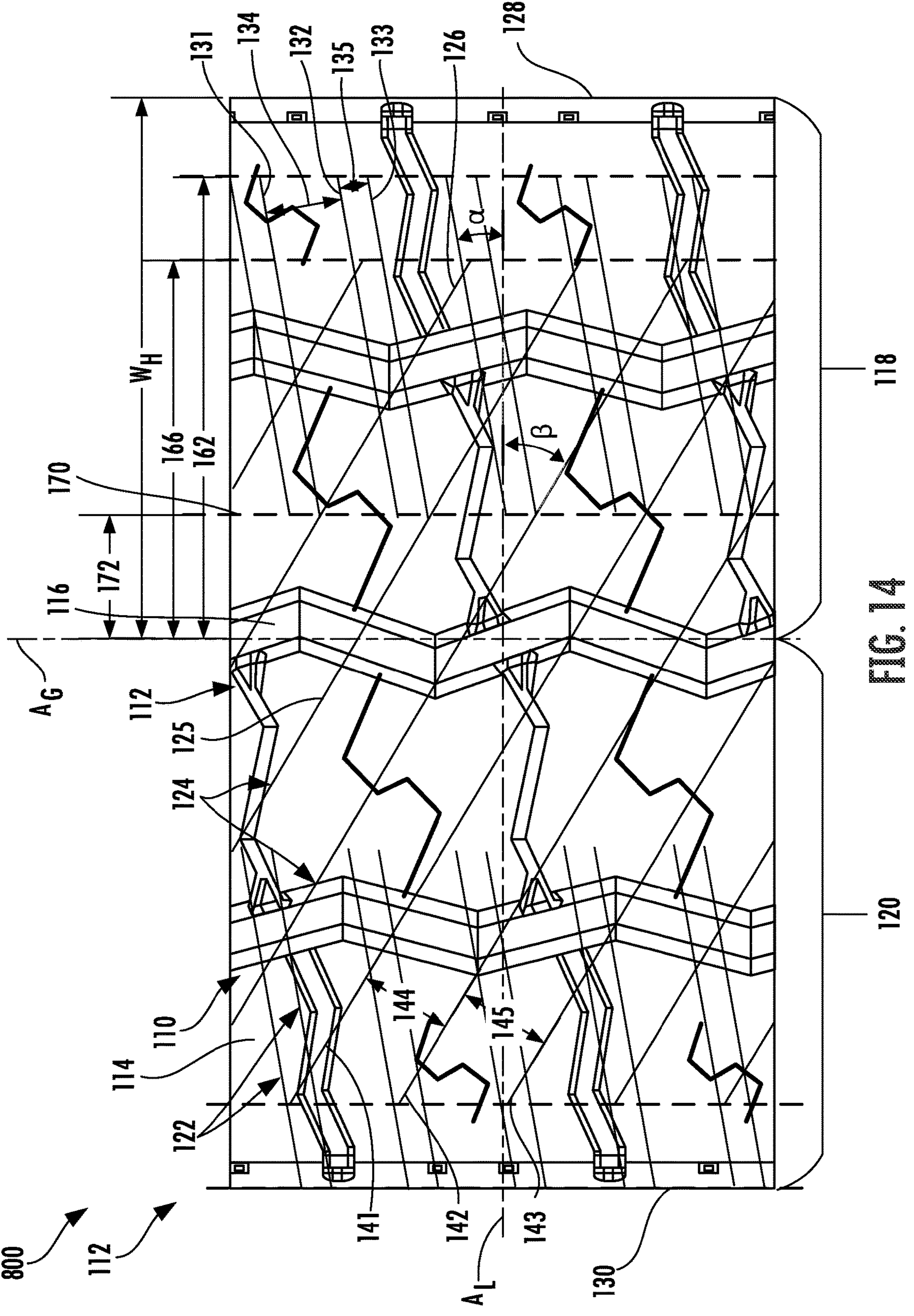
FIG. 14 is a top view of a tire tread, according to yet another example embodiment.

Turning now to FIG. 14, a tire tread 800 is shown, according to an example embodiment. The tire tread 800 is similar to the tire tread 100. Accordingly, similar numbering is used to denote similar parts. A difference between the tire tread 100 and the tire tread 800 is the configuration of the sipes 125. Specifically, the first set of sipes 122 in the first portion 118 are positioned entirely between the first edge 128 and the longitudinal axis $A_G$ such that the first set of sipes 122 do not intersect either of the longitudinal axis $A_G$ or the first edge 128. The first set of sipes 122 begin (e.g., terminate) on a third sipe plane 170 positioned a third sipe distance 172 from the longitudinal axis $A_G$. The first set of sipes 122 extend between the first sipe plane 160 and the third sipe plane 170. On the second portion 120, the first set of sipes 122 are collinear with the first set of sipes 122 on the first portion 118 even though the first set of sipes are discontinuous. In some embodiments, the second set of sipes 124 is similar to the first set of sipes 122 such that none of the sipes 125 intersects the longitudinal axis $A_G$.

Figure 15:
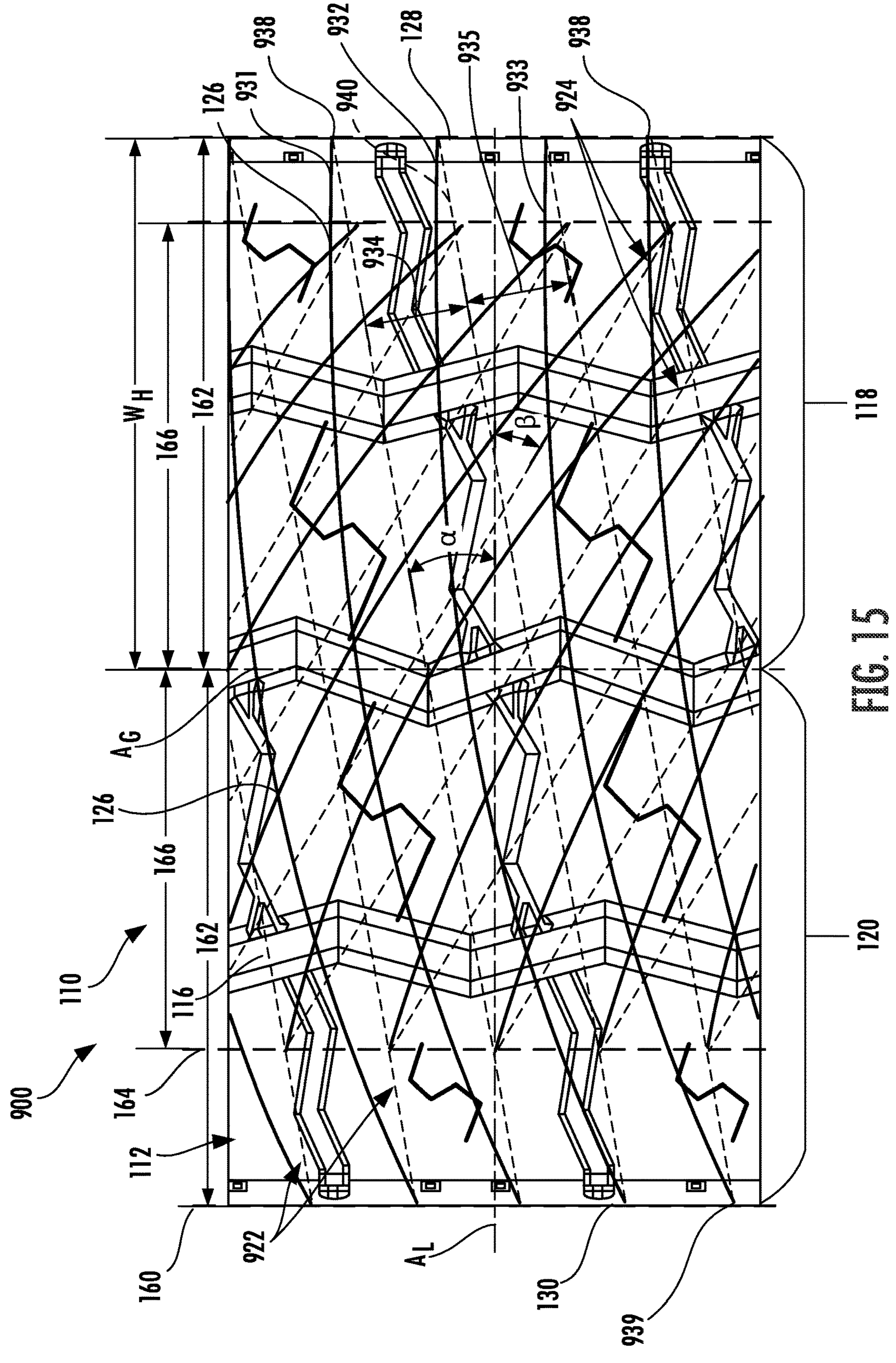
FIG. 15 is a top view of a tire tread, according to yet another example embodiment.

Turning now to FIG. 15, a tire tread 900 is shown, according to an example embodiment. The tire tread 900 is similar to the tire tread 100. Accordingly, similar numbering is used to denote similar parts. A difference between the tire tread 100 and the tire tread 900 is that the tire tread 900 includes a first set of sipes 922 and a second set of sipes 924, both the first set of sipes 922 and the second set of sipes 924 having a curvature. In some embodiments, the curvature is defined by a radius. In some embodiments, the curvature is defined by an equation, such as a polynomial equation. The first set of sipes 922 extend between the first sipe plane 160 nearer the first edge 128 and the first sipe plane 160 nearer the second edge 130. The first set of sipes 922 includes a first sipe 931, a second sipe 932, and a third sipe 933. Each of the first sipe 931, the second sipe 932, and the third sipe 933 intersect the first sipe plane 160 at a leading point 938 and a trailing point 939. The angle of each of the first sipe 931, the second sipe 932, and the third sipe 933 is defined as the angle formed between a straight line connecting the leading point 938 and the trailing point 939 (angle line 940, shown by dotted lines in FIG. 15) and the lateral axis $A_L$. As shown, each of the first set of sipes 922 defines a first angle α. In some embodiments, such as shown in FIG. 15, the curvature of the first sipe 931 is defined such that the first sipe 931 does not intersect the angle line 940 of any of the sipes of the first set of sipes 922 that neighbors the first sipe 931. In some embodiments, the first sipe 931 intersects one or more angle lines 940. For example, the first sipe 931 may have a substantially triangular profile between the leading point 938 and the trailing point 939 with the vertex of the triangular profile being positioned near the longitudinal axis $A_G$. As a result of this profile, the first sipe 931 may intersect multiple angle lines 940.

Each of the first sipe 931, the second sipe 932, and the third sipe 933 may be positioned apart from one another at any suitable pitch or distance therefrom. Specifically, the first sipe 931 and the second sipe 932 are positioned apart by a first pitch distance 934 and the second sipe 932 and the third sipe 933 are positioned apart a second pitch distance 935. The first pitch distance 934 and the second pitch distance 935 are measured as the distance between the angle lines 940. In some embodiments, the first pitch distance 134 and the second pitch distance 135 are between 5-40 millimeters (mm), inclusive. In some embodiments, the first pitch distance 134 and the second pitch distance 135 are different from one another.

Similar to the first set of sipes 922, the second set of sipes 924 extend between the second sipe plane 164 nearer the first edge 128 and the second sipe plane 164 nearer the second edge 164. While the tire tread 900 includes curved (e.g., non-linear) sipes, the pitch distances and angles discussed with reference to tire treads 100, 200, 300, 400, 500, 600, 700, and 800 may be applicable to the first set of sipes 922 and the second set of sipes 924 of the tire tread 900. For example, the first set of sipes 922 may be discontinuous across the width of the tire tread 900, similar to the first set of sipes 122 shown in FIG. 14. In some embodiments, the first set of sipes 922 and the second set of sipes 924 are symmetrical about the longitudinal axis $A_G$, such as shown in FIG. 8.

Referring now to TABLES 1-3, test data were collected comparing the acceleration on snow of a standard reference test tire (SRTT), Candidate 1 (a tire of the present disclosure according to Table 1), and Candidate 2 (a tire having the tread pattern of Candidate 1, but not having the sipes 125). The test was an ISO 18106 "acceleration on snow" test for C3 tires. An SRTT is a tire that is produced, controlled, and stored in accordance with the ASTM standards F2870 (2011) for the size 315/70R22.5. Candidate 1 includes a tire tread similar to the tire tread 100 of FIG. 1 and sipes 125 according to Table 1, shown below:

TABLE 1

| Feature as shown in FIG. 1 | Dimension (units vary) |
|---|---|
| First sipe distance (162) as a percentage of half width $W_H$ | 100% |
| Second sipe distance (166) as a percentage of half width $W_H$ | 100% |
| Sipe depth $D_S$ of the first set of sipes (122) as a percentage of the height $L_H$ of the tread element (112) | 101% |
| Sipe depth $D_S$ of the second set of sipes (124) as a percentage of the height $L_H$ of the tread element (112) | 101% |
| First pitch distance (144) | 0.5" |
| Second pitch distance (145) | 0.5" |
| First pitch distance (134) | 0.5" |

TABLE 1-continued

| Feature as shown in FIG. 1 | Dimension (units vary) |
|---|---|
| Second pitch distance (135) | 0.5" |
| First angle α | 20° |
| Second angle β | 20° |

The test data for the SRTT, Candidate 1, and Candidate 2 are shown below in Table 2. All units shown in Table 2 are in meters per squared second ($m/s^2$).

TABLE 2

ISO 18106: Acceleration of Various Tires on a Snow-covered Surface

| | Tire Specification | | |
|---|---|---|---|
| Run number | SRTT | Candidate 1 | Candidate 2 |
| 1 | 0.47 | 1.48 | 0.61 |
| 2 | 0.49 | 1.54 | 0.61 |
| 3 | 0.48 | 1.47 | 0.61 |
| 4 | 0.48 | 1.42 | 0.61 |
| 5 | 0.47 | 1.51 | 0.63 |
| 6 | 0.49 | 1.51 | 0.64 |

Table 2 shows that the acceleration of Candidate 1 on snow as approximately three times greater than the acceleration of the SRTT on snow, and approximately 2.5 times greater than the acceleration of Candidate 2 on snow. In other words, the Candidate 1 tire outperforms both the SRTT and Candidate 2 in accelerating on surfaces covered in packed snow. The acceleration performance increase of Candidate 1 over both the SRTT and Candidate 2 affects a vehicle's ability to accelerate in snowy conditions. In some exemplary embodiments this may contribute to potentially stopping sooner as compared to tires that do not includes the sipes (e.g., sipes 125, sipes 922, sipes 924) outlined above with reference to FIGS. 1-15.

Referring now to Table 3 (below), the snow indexes of the SRTT, Candidate 1, and Candidate 2 are shown. The snow index (e.g., snow grip index) is calculated as the relative grip performance of the candidate tire (e.g., Candidate 1, Candidate 2) to the reference tire (e.g., SRTT). A snow index of greater than one means that the candidate tire has better (e.g., more) grip in the snow when compared to the reference tire. A snow index of less than one means that the candidate tire has less grip in snow than the reference tire. The reference tire has a snow index of one (1.00).

TABLE 3

ISO 18106: Snow Index of Various Tires

| Tire Specification | SRTT | Candidate 1 | Candidate 2 |
|---|---|---|---|
| Snow Index | 1.00 | 3.12 | 1.26 |

As shown in Table 3 above, the snow index of the Candidate 1 tire is greater than the snow index of both the SRTT and Candidate 2, which means that Candidate 1 has superior acceleration and grip performance in the snow when compared to the SRTT and Candidate 2.

The use of the terms "a" and "an" and "the" and similar referents refer to both the singular and the plural, unless otherwise indicated herein or clearly contradicted by context. The terms "comprising," "having," "including," and "containing" are open-ended terms (e.g., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter and does not pose a limitation unless otherwise claimed. No language in the specification should be construed as being absolute on a scale but should only indicate relative improvement, nothing should be construed as indicating any non-claimed element as essential.

It should be noted that the term "example" as used herein to describe some embodiments is intended to indicate that some embodiments are possible examples, representations, and/or illustrations of possible embodiments (and such term is not intended to connote that some embodiments are necessarily extraordinary or superlative examples).

As used herein, the terms "about" and "approximately" generally mean plus or minus 10% of the stated value. For example, about 0.5 would include 0.45 and 0.55, about 10 would include 9 to 11, about 1000 would include 900 to 1100.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Preferred embodiments are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While this specification contains many specific implementation details, these should not be construed as limitations on the scope of this disclosure or of what may be claimed, but rather as descriptions of features specific to particular implementations. Certain features described in this specification in the context of separate implementations can also be implemented in combination in a single implementation. Various features described in the context of a single implementation can also be implemented in multiple implementations separately or in any suitable subcombination. Although features may be described above as acting in certain combinations and even initially claimed as such, one or more features from a claimed combination can in some cases be excised from the combination, and the claimed combination may be directed to a subcombination or variation of a subcombination.

What is claimed is:

1. A tire tread comprising:

a plurality of tread elements positioned on a tire tread surface so as to comprise a tread pattern;

a plurality of grooves provided between the plurality of tread elements;

a first set of sipes extending from a longitudinal axis of the tire tread and toward a first edge of the tire tread at a first non-zero angle with respect to a lateral axis of the tire tread, the first set of sipes defining a first length from a first termination point to a second termination point; and a second set of sipes extending from the longitudinal axis and toward the first edge of the tire tread at a second non-zero angle with respect to the lateral axis, the second set of sipes intersecting the first set of sipes, the second set of sipes defining a second length from a third termination point to a fourth termination point;

wherein each sipe of the first set of sipes has a first depth along the first length and each sipe of the second set of sipes has a second depth along the second length, the first depth being different from the second depth; and wherein the first depth and the second depth are greater than 50% of a height of the plurality of tread elements.

2. The tire tread of claim 1, wherein each of the first set of sipes and the second set of sipes extend beyond 50% of a half width of the tire tread relative to the longitudinal axis.

3. The tire tread of claim 1, wherein the first set of sipes intersect the second set of sipes at the longitudinal axis.

4. The tire tread of claim 1, wherein:

the first set of sipes extends between 40-80% of the half-width of the tire tread, inclusive; and the second set of sipes extends to 100% of the half width of the tire tread.

5. The tire tread of claim 1, wherein at least one of the first depth or the second depth are in a range of 60% to 100% of the height of the plurality of tread elements.

6. The tire tread of claim 1, wherein at least one of the first depth or the second depth are greater than 100% of the height of the plurality of tread elements.

7. The tire tread of claim 1, wherein the first non-zero angle is in a range of 5 degrees to 40 degrees with respect to the lateral axis and the second non-zero angle is in a range of −5 to −40 degrees with respect to the lateral axis.

8. A tire tread comprising:

a first set of sipes extending from a longitudinal axis of the tire tread towards a first edge of the tire tread at a first non-zero angle with respect to a lateral axis of the tire tread, the first set of sipes defining a first length from a first termination point to a second termination point, the first set of sipes comprising:

a first sipe; and a second sipe positioned at a first pitch distance from the first sipe; and a second set of sipes extending from the longitudinal axis toward the first edge of the tire tread at a second non-zero angle with respect to the lateral axis, the second set of sipes defining a second length from a third termination point to a fourth termination point, the second set of sipes comprising:

a third sipe; and a fourth sipe positioned at a second pitch distance from the third sipe;

wherein the first non-zero angle is different from the second non-zero angle;

wherein each sipe of the first set of sipes has a first depth along the first length and each sipe of the second set of sipes has a second depth along the second length, the first depth being different from the second depth; and wherein the first depth and the second depth are greater than 50% of a height of a plurality tread elements of the tire tread.

9. The tire tread of claim 8, wherein each of the sipes of the first set of sipes and each of the sipes of the second set of sipes is linear.

10. The tire tread of claim 8, wherein the first pitch distance is different from the second pitch distance.

11. The tire tread of claim 8, wherein the first sipe intersects both the third sipe and the fourth sipe.

12. The tire tread of claim 8, wherein the first set of sipes further comprises a fifth sipe positioned at a third pitch distance from the second sipe, the third pitch distance being different from the first pitch distance.

13. A tire tread comprising:

a first set of sipes extending from a longitudinal axis of the tire tread towards a first edge of the tire tread at a first non-zero angle with respect to a lateral axis of the tire tread, the first set of sipes defining a first length from a first termination point to a second termination point, the first set of sipes comprising a first sipe; and a second set of sipes extending from the longitudinal axis toward the first edge of the tire tread at a second non-zero angle with respect to the lateral axis, the second set of sipes defining a second length from a third termination point to a fourth termination point, the second set of sipes comprising:

a second sipe;

a third sipe positioned at a first pitch distance from the second sipe; and a fourth sipe positioned at a second pitch distance from the third sipe;

wherein each sipe of the first set of sipes has a first depth along the first length and each sipe of the second set of sipes has a second depth along the second length, the first depth being different from the second depth;

wherein the first depth and the second depth are greater than 50% of a height of a plurality tread elements of the tire tread;

wherein the first non-zero angle is different from the second non-zero angle; and wherein the first sipe intersects each of the second sipe, the third sipe, and the fourth sipe.

14. The tire tread of claim 13, wherein:

the first sipe extends to between 60-80% of the half width of the tire tread, inclusive; and the second set of sipes extends to 100% of the half width of the tire tread.

15. The tire tread of claim 13, wherein the first pitch distance is different from the second pitch distance.

16. The tire tread of claim 13, wherein each of the sipes of the first set of sipes and each of the sipes of the second set of sipes are linear.

17. The tire tread of claim 13, further comprising a groove that extends into a patterned surface of the tire tread, the groove having a groove depth that is greater than the first depth and the second depth such that each of the first sipe, the second sipe, the third sipe, and the fourth sipe are discontinuous at the groove.

18. The tire tread of claim 13, further comprising a groove that extends into a patterned surface of the tire tread, the groove having a groove depth that is less than the second depth such that each of the second sipe, the third sipe, and the fourth sipe are continuous through the groove.

19. A tire tread comprising:

a plurality of tread elements positioned on a tire tread surface and forming a tread pattern, one or more of the plurality of tread elements defining a tread element height;

a first set of sipes defining a first length extending between a first edge of the tire tread and a second edge of the tire tread at a first non-zero angle with respect to a lateral axis of the tire tread, the first set of sipes including a first sipe having a first depth along the length and a second sipe having a second depth different from the first depth, each sipe in the first set of sipes positioned apart from one another by a pitch distance; and a second set of sipes defining a second length extending between the first edge of the tire tread and the second edge of the tire tread at a second non-zero angle different from the first non-zero angle with respect to the lateral axis of the tire tread, the second set of sipes having a third depth different from the first depth and the second depth;

wherein the first depth, the second depth, and the third depth are greater than 50% of the tread element height; and wherein the first set of sipes intersects the second set of sipes.

20. The tire tread of claim 19, wherein the first non-zero angle is between about 5 degrees to about 40 degrees, inclusive.

21. The tire tread of claim 19, wherein the pitch distance is between about 0.5 inches to about 0.75 inches, inclusive.

22. The tire tread of claim 19, wherein the first set of sipes does not extend to the first edge and the second edge, the first set of sipes extending across less than 100% of a width of the tire tread.

23. The tire tread of claim 19, wherein each sipe in the first set of sipes is linear and positioned parallel to one another.

* * * * *